US009926975B2

(12) United States Patent
Smedresman et al.

(10) Patent No.: US 9,926,975 B2
(45) Date of Patent: Mar. 27, 2018

(54) CENTERING SPRING AND DAMPER ASSEMBLY (71) Applicant: United Technologies Corporation, Hartford, CT (US)

(72) Inventors: Adam G. Smedresman, Larchmont, NY (US); Jacek G. Stec, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 30 days.

(21) Appl. No.: 15/077,588

(22) Filed: Mar. 22, 2016

(65) Prior Publication Data
US 2017/0276173 A1    Sep. 28, 2017

(51) Int. Cl.
F16C 27/04    (2006.01)
F16F 15/02    (2006.01)
F01D 25/16    (2006.01)
F16F 15/023   (2006.01)

(52) U.S. Cl.
CPC .......... F16C 27/045 (2013.01); F01D 25/164 (2013.01); F16F 15/022 (2013.01); F16F 15/0237 (2013.01); F05D 2220/32 (2013.01); F05D 2240/50 (2013.01); F05D 2260/30 (2013.01); F05D 2260/38 (2013.01); F16C 2360/23 (2013.01)

(58) Field of Classification Search
CPC ...... F16C 27/04; F16C 27/045; F16C 27/066; F16F 15/022; F16F 15/0237
USPC ............................. 384/99, 535, 536, 581, 582
See application file for complete search history.

(56) References Cited

U.S. PATENT DOCUMENTS

| 3,639,014 | A |   | 2/1972 | Sixsmith |
|-----------|---|---|--------|----------|
| 4,971,457 | A | * | 11/1990 | Carlson ................. F01D 25/164 384/581 |
| 5,201,585 | A |   | 4/1993 | Gans et al. |
| 5,380,100 | A | * | 1/1995 | Yu ....................... F16F 15/0237 267/113 |
| 5,421,655 | A | * | 6/1995 | Ide ........................ F01D 25/164 384/99 |
| 5,603,574 | A |   | 2/1997 | Ide et al. |
| 5,660,481 | A | * | 8/1997 | Ide ........................ F16C 17/035 384/122 |
| 7,625,121 | B2 |  | 12/2009 | Pettinato et al. |
| 7,628,542 | B2 |  | 12/2009 | Wada et al. |
| 8,083,413 | B2 |  | 12/2011 | Ertas |
| 8,182,153 | B2 |  | 5/2012 | Singh et al. |

(Continued)

OTHER PUBLICATIONS

Bugra H. Ertas, Complaint Hybrid Journal Bearings Using Integral Wire Mesh Dampers, Journal of Engineering for Gas Turbines and Power, Mar. 2009, 11 pages, vol. 131.

(Continued)

Primary Examiner — James Pilkington
(74) Attorney, Agent, or Firm — Kinney & Lange, P.A.

(57) ABSTRACT

An assembly includes a bearing having an annular shape, a bearing support radially outward from the bearing, a squeeze film damper having a first end adjacent the bearing and a second end adjacent the bearing support with the second end forming a squeeze film damping surface, and a first spring between the bearing and the bearing support with the first spring configured to resist a movement of the bearing to center a shaft radially inward from the bearing.

15 Claims, 2 Drawing Sheets (56) References Cited

U.S. PATENT DOCUMENTS

2007/0248293 A1 10/2007 Pettinato et al.
2015/0233293 A1* 8/2015 Grogg ..................... F02C 7/06
248/562

OTHER PUBLICATIONS

Extended European Search Report for EP Application No. 17162317.6, dated Sep. 18, 2017, 6 pages.

* cited by examiner

CENTERING SPRING AND DAMPER ASSEMBLY

BACKGROUND

The present disclosure relates to machinery with rotating shafts and more particularly, to centering springs and dampers used with bearings and shafts in an engine.

Rotating shafts and other rotating turbomachinery in engines are supported by arrays of antifriction bearings connected to nonrotating structures. During operation, the rotating shafts and other rotating turbomachinery can vibrate about the engine centerline. If not dampened, these vibrations can cause excessive structural loads and result in damage. Dampers are used adjacent to the bearings to reduce the amplitudes of vibrations in the rotating shaft that are transmitted to the rest of the engine. Coulomb and viscous dampers are two of a variety of dampers that can be utilized. One commonly used viscous damper is the squeeze film damper, which utilizes a small, fluid-filled annular gap between the bearing and a nonrotating housing. Radial motion of the rotating shaft causes relative motion between the bearing and the nonrotating housing, which changes the gap to squeeze a damping fluid within the annulus, dampening the motion of the rotating shaft. The nonrotating housing and the bearing are usually connected by a centering spring to support the rotating shaft and to move the bearing and shaft towards the centerline when they become off centered. A centering spring design known as the squirrel cage is often used to connect the housing to the bearing and is comprised of a plurality of circumferentially spaced beam springs, acting as the centering springs. Squirrel cages have several notable disadvantages. First, they tend to be axially long and may require increased engine length, adversely impacting weight and major performance metrics. Second, the beam springs of the squirrel cage must be machined into the damper assembly and/or the bearing, which causes additional manufacturing and installation time, and the entire assembly must be replaced if one of those beam springs or the damping surface is damaged. Third, the squirrel cage imposes undesirable resultant moments on its mating housing.

SUMMARY

An assembly includes a bearing having an annular shape, a bearing support radially outward from the bearing, a squeeze film damper having a first end adjacent to the bearing and a second end adjacent to the bearing support with the second end forming a squeeze film damping surface, and a first spring between the bearing and the bearing support with the first spring configured to resist a movement of the bearing to center a shaft radially inward from the bearing.

An assembly for centering and damping a shaft includes a damper having an annular shape with a radially inner first end and a radially outer second end with the second end having a damping surface on a radially outer side, and at least one spring axially adjacent to the damper configured to resist a radial movement of the shaft.

A gas turbine engine includes a shaft, a bearing radially surrounding at least a portion of the shaft, a bearing housing radially outward from the bearing, a squeeze film damper between the bearing and the bearing housing, and a first spring adjacent the squeeze film damper between the bearing and the bearing housing configured to keep the shaft centered with respect to the bearing housing.

The present summary is provided only by way of example and not limitation. Other aspects of the present disclosure will be appreciated in view of the entirety of the disclosure, including the entire text, claims, and accompanying figures.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

As will be discussed in detail below, centering spring and damper assembly 16/116 for use in machinery with rotating shafts, such as bearing compartment 10/110, is disclosed herein that includes squeeze film damper 28/128 radially outward from bearing 14/114 between bearing 14/114 and housing 18/118, and one or both of first centering spring 38/138 and second centering spring 40/140 on each axial side of squeeze film damper 28/128. Squeeze film damper 28/128 can have first end 30 adjacent to bearing 14/114 that can form outer race 26/126 for bearing 14/114 and second end 32/132 adjacent to housing 18/118. A radially outer end of second end 32/132 of squeeze film damper 28/128, which forms a squeeze film damping surface, and an inner surface of housing 18/118 form gap 44/144 therebetween to accommodate a damping fluid to dampen vibration of bearing 14/114 caused by vibration of shaft 12/112 supported by bearing 14/114. First centering spring 38/138 and second centering spring 40/140 expand and compress in the radial direction to support bearing 14/114 and center shaft 12/112. First centering spring 38/138 and second centering spring 40/140 can expand and compress entirely in the radial direction and can be located entirely between bearing 14/114 and housing 18/118. Squeeze film damper 28/128 and the centering springs work in parallel to dampen movement of shaft 12/112 and center shaft 12/112.

Centering spring and damper assembly 16/116 has many benefits. Centering springs 38/138 and 40/140 and squeeze film damper 28/128 work in parallel and can be contained in a relatively small area between bearing 14/114 and housing 18/118. The configuration allows for an axially compact centering spring and damper assembly 16/116 as compared to the axially long squirrel cage configuration. Because centering spring and damper assembly 16/116 is axially compact, the overall length of the engine can be shortened, resulting in reduced weight and greater performance metrics. Further, the more compact centering spring and damper assembly 16/116 can free up space for other features in the engine. While the centering springs 38/138 and 40/140 and squeeze film damper 28/128 work in parallel, they are separate components that can be removed and replaced individually if damaged. This reduces the time and cost of maintenance. Centering spring and damper assembly 16/116 may have a reduced part count as compared to the squirrel cage configurations, as the squirrel cage configurations often require bolted and/or clamped flanges. The reduction in part count can also reduce the weight of the engine as compared to the squirrel cage configurations, further increasing the efficiency of the engine. Because centering spring and damper assembly 16/116 does not require bolted and/or clamped flanges as with the squirrel cage configurations, the assembly and inspection time may be reduced. Also, the radially extending first centering spring 38/138, second centering spring 40/140, and squeeze film damper 28/128 provide a more direct load path as opposed to the squirrel cage configurations, which create large moment reactions. First centering spring 38/138 and second centering spring 40/140 can have numerous configurations that center shaft 12/112 and provide support. First centering spring 38/138 and second centering spring 40/140 can be altered depending on the adjacent bearing 14/114 and the engine in which centering spring and damper assembly 16/116 is located. First centering spring 38/138 and second centering spring 40/140 can be annular in that one or both centering springs extend circumferentially entirely around bearing 14/114, or first centering spring 38/138 and second centering spring 40/140 can extend only circumferentially partially around bearing 14/114.

Figure 1A:
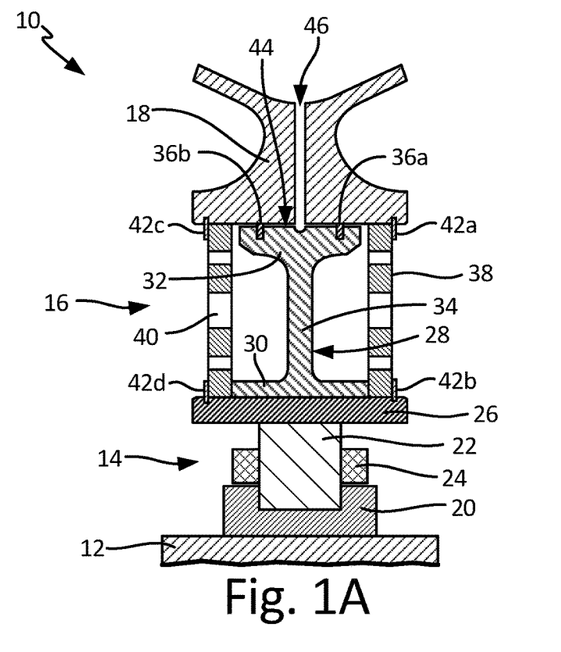
FIG. 1A is a cross-sectional view of one embodiment of the centering spring and damper assembly within a bearing compartment.
Figure 1B:
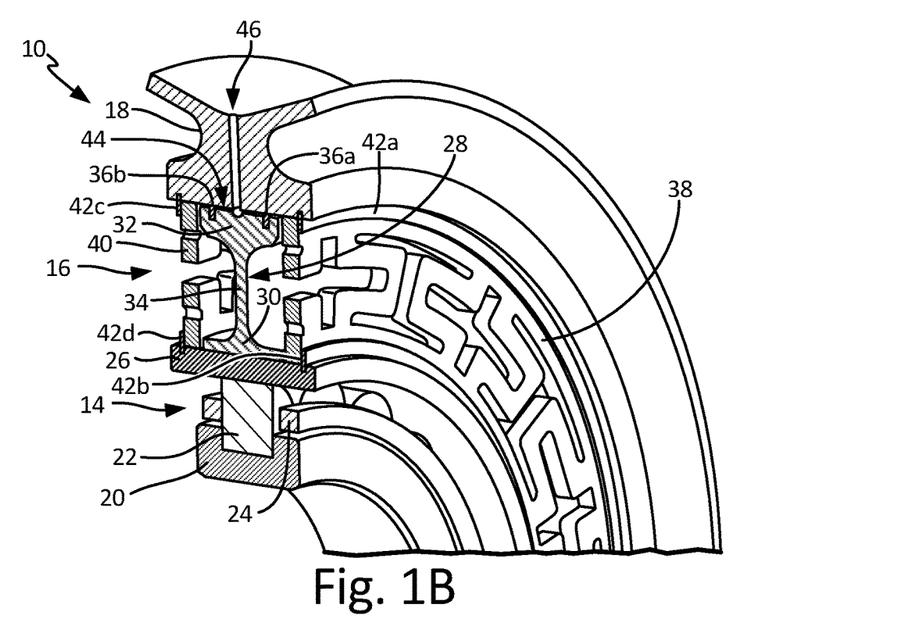
FIG. 1B is a partial perspective cross-sectional view of the centering spring and damper assembly in FIG. 1A.

FIG. 1A is a cross-sectional view of one embodiment of the centering spring and damper assembly, and FIG. 1B is a partial perspective cross-sectional view of the centering spring and damper assembly in FIG. 1A. FIGS. 1A and 1B show bearing compartment 10 including shaft 12, bearing 14, centering spring and damper assembly 16, and housing 18. Bearing 14 includes inner race 20, rollers 22, separator 24, and outer race 26. Centering spring and damper assembly 16 includes squeeze film damper 28 (which has first end 30, second end 32, beam 34, first sealing ring 36a, and second sealing ring 36b), first centering spring 38, second centering spring 40, and retaining rings 42a-42d. Radially between squeeze film damper 28 and housing 18 is gap 44. Within housing 18 is channel 46.

The disclosure discusses components as they pertain to bearing compartment 10, but the disclosed embodiments of centering spring and damper assembly 16 can be incorporated into any machine in which centering and damping of a shaft or another member is advantageous. Bearing compartment 10 can be in an engine on an aircraft, an engine used for industrial purposes, or an engine used in other applications, as well as other types of machinery, such as centrifuges.

Shaft 12 is a rotating member that rotates at a radial center of bearing compartment 10 along a centerline of a machine in which bearing compartment 10 is located. Shaft 12 can be substantially cylindrical and can include other rotating components, such as rotors. Shaft 12 runs along the centerline of bearing compartment 10 and can connect to a variety of components (such as a fan, a compressor, and a turbine) within the machine in which bearing compartment 10 is located and/or to a variety of components outside the machine. The configuration and functionality of shaft 12 within bearing compartment 10 is common and known to those of ordinary skill in the art.

Bearing 14 is radially outward from and supports shaft 12 and includes inner race 20, roller 22, separator 24, and outer race 26. Inner race 20 has an annular shape and is the radially innermost component of bearing 14 adjacent to shaft 12. Inner race 20 is connected to shaft 12 and rotating in conjunction with shaft 12. Inner race 20 can be one continuous and monolithic piece with shaft 12, or can be a separate piece from shaft 12 and be connected through a variety of means, such as an interference fit, welding, bolts, rivets, or other fasteners. Radially outward from inner race 20 are rollers 22 and separator 24. Rollers 22 are cylindrical components that roll within bearing 14 between inner race 20 and outer race 26. Bearing 14 can be configured to have any number of rollers 22, but there should be enough rollers 22 to provide support to inner race 20 and sufficiently and effectively transfer radial loads between inner race 20 and outer race 26. Separator 24 has an annular shape with openings within which corresponding rollers 22 sit. Separator 24 functions to keep rollers 22 from contacting one another and ensures rollers 22 can roll smoothly within bearing 14. Outer race 26 has an annular shape and is the radially outermost component of bearing 14 adjacent to centering spring and damper assembly 16. Outer race 26 is a nonrotating component radially outward from rollers 22. Outer race 26 transfers radial loads from rollers 22 to centering spring and damper assembly 16 (and vice versa). Bearing 14 functions to support rotating shaft 12 and transfer loads from shaft 12 to radially outward components, such as housing 18. While the present disclosure describes bearing 14 as a roller bearing, bearing 14 can be configured to be a number of other types of bearings, including a ball bearing, a plain bearing, a foil bearing, or another type of bearing. The configuration and functionality of bearing 14 is common and known to those of ordinary skill in the art, and centering spring and damper assembly 16 can be configured to function with any type of bearing.

Centering spring and damper assembly 16 is radially outward from outer race 26. Centering spring and damper assembly 16 includes squeeze film damper 28, first centering spring 38, second centering spring 40, and retaining rings 42a-42d. Squeeze film damper 28 includes first end 30 adjacent to bearing 14, second end 32 adjacent to housing 18 (with gap 44 being between second end 32 and housing 18), and beam 34 between first end 30 and second end 32. Second end 32 includes first sealing ring 36a and second sealing ring 36b (also known as piston rings) radially between second end 32 and housing 18. The components of centering spring and damper assembly 16 work together to keep shaft 12 supported and dampen any movement/vibration of shaft 12. Centering spring and damper assembly 16 takes up little axial space and fits radially between bearing 14 and housing 18.

Squeeze film damper 28 is radially between outer race 26 and a radially inner surface of housing 18. Squeeze film damper 28 has an annular shape and can be configured to have a cross section that is "I" shaped with first end 30 and second end 32 forming top and bottom horizontally extending components and beam 34 forming a vertically extending component that connects first end 30 to second end 32. While this disclosure discusses damping using squeeze film damper 28, centering spring and damper assembly 16 can be configured to accommodate other types of dampers, such as Coulomb dampers, and reference to squeeze film damper 28 throughout this disclosure also includes other types of dampers.

Figure 2A:
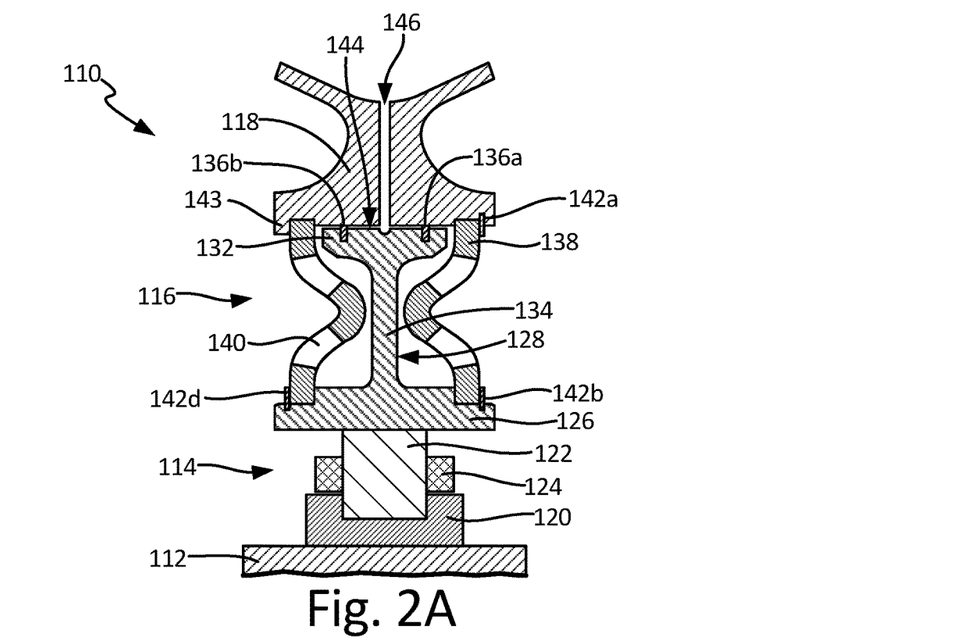
FIG. 2A is a cross-sectional view of another embodiment of the centering spring and damper assembly within a bearing compartment.
Figure 2B:
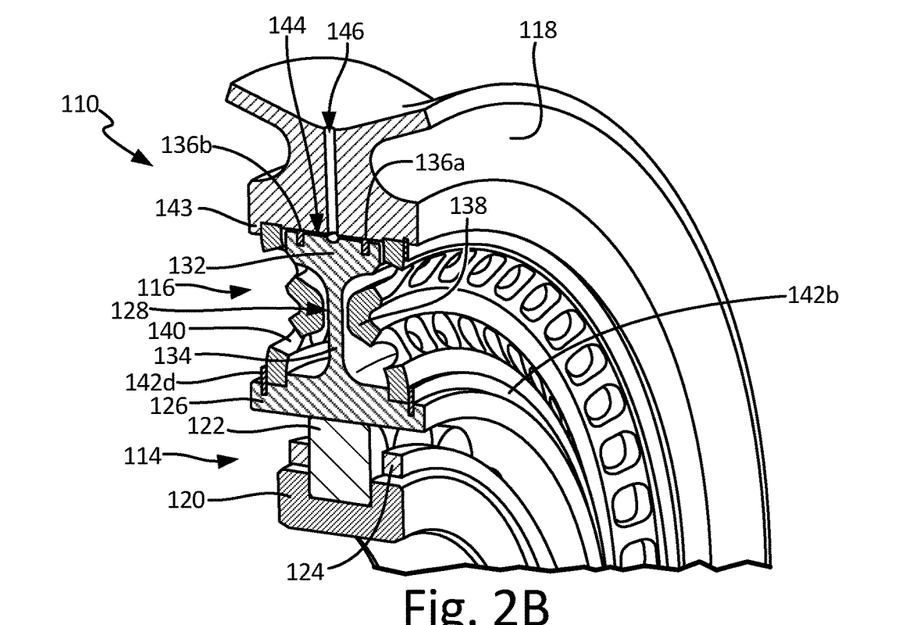
FIG. 2B is a partial perspective cross-sectional view of the centering spring and damper assembly in FIG. 2A.

First end 30 is adjacent to outer race 26 and can be axially extending to form a hollow cylindrical shape. First end 30 can be connected through various fastening means to outer race 26 or can be one continuous and monolithic piece with outer race 26 (i.e., forged or cast with outer race 26) such that first end 30 and outer race 26 are the same component and a radially inner end of beam 34 connects to outer race 26 (as shown in FIGS. 2A and 2B). As shown in FIGS. 1A and 1B, first end 30 can have an axial length that is less than an axial length of outer race 26. Additionally, first end 30 can have an axial length that extends to contact first centering spring 38 on one side and second centering spring 40 on another side to help hold first centering spring 38 and second centering spring 40 in place adjacent to squeeze film damper 28 and in contact with outer race 26.

Second end 32 is adjacent to housing 18 and can be axially extending to form a hollow cylindrical shape. As shown in FIGS. 1A and 1B, second end 32 can have an axial length that is less than an axial length of housing 18. Additionally, second end 32 can have an axial length that extends to contact first centering spring 38 on one side and second centering spring 40 on another side to help hold first centering spring 38 and second centering spring 40 in place adjacent to squeeze film damper 28. Second end 32 is configured adjacent to housing 18 such that gap 44 is present between a radially outer surface of second end 32 and a radially inner surface of housing 18. The radially outer surface of second end 32 forms a squeeze film damping surface that is in contact with a damping fluid within gap 44 to dampen any movement of squeeze film damper 28 caused by a movement of shaft 12 (which is transferred to squeeze film damper 28 through bearing 14).

Second end 32 includes first sealing ring 36a and second sealing ring 36b (also known as piston rings) on the squeeze film damping surface. First sealing ring 36a and second sealing ring 36b seal each end of gap 44 between second end 32 and housing 18 to prevent damping fluid from escaping gap 44. First sealing ring 36a and second sealing ring 36b can be constructed from a variety of materials, but should be a resilient material that can handle compression due to movement of second end 32 of squeeze film damper 28 while also remaining in contact with housing 18 and second end 32 to prevent damping fluid from flowing out of gap 44. First sealing ring 36a and second sealing ring 36b can sit within corresponding grooves in the squeeze film damping surface of second end 32 (as shown in FIGS. 1A and 1B) or can be on the surface of the squeeze film damping surface without a groove. First sealing ring 36a and second sealing ring 36b can be held in place by being squeezed between second end 32 and housing 18 and/or can have anti-rotation features.

Beam 34 extends radially between first end 30 and second end 32. Beam 34 is radially extending and can be a single, annular shaped beam (i.e., forming a cross section that is "I" shaped with first end 30 and second end 32) as shown in FIGS. 1A and 1B, or beam 34 can be multiple radially extending beams (i.e., forming a cross section that is a hollow rectangular shape with first end 30 and second end 32 or forming a cross section that is "X" shaped). Beam 34 should have a configuration and axial thickness that provides structural support to and transfers load between first end 30 and second end 32. Beam 34 can be connected to first end 30 and second end 32 through a variety of fasteners, including welding, gluing, riveting, bolting, or another fastening means. Additionally, first end 30, second end 32, and beam 34 can be one continuous and monolithic piece (along with outer race 26 if first end 30 is not present in another embodiment). First end 30, second end 32, and beam 34 can be constructed from a variety of materials, including steel, titanium, another high-tensile metal, a composite material, and/or other materials. However, the squeeze film damping surface of second end 32 should be constructed from a material or having a coating that does not chemically interact with the damping fluid to cause corrosive problems or other issues.

First centering spring 38 and second centering spring 40 are radially between and in contact with outer race 26 and housing 18 and are adjacent to each axial side of squeeze film damper 28. Each of first centering spring 38 and second centering spring 40 can be annular in shape (i.e., extending entirely circumferentially around bearing 14) and provide support to outer race 26 to keep shaft 12 centered about the centerline of gas turbine engine 10. First centering spring 38 and second centering spring 40 can also be configured to extend only partially circumferentially around bearing 14 or be partially or completely offset circumferentially around bearing 14 such that first centering spring 38 is not adjacent to squeeze film damper 28 at a same axially position as second centering spring 40. Additionally, while the disclosure shows two centering springs, other embodiments can include only one centering spring on one side of squeeze film damper 28.

Each of first centering spring 38 and second centering spring 40 compress and expand entirely in the radial direction as shown in FIGS. 1A and 1B, but other embodiments can have a configuration such that first centering spring 38 and second centering spring 40 bend and/or have other shapes (see FIGS. 2A and 2B). First centering spring 38 and second centering spring 40 are springs or other resilient members that are able to accept loads from outer race 26 (caused by shaft 12 moving off center) and react those loads back towards outer race 26 while using housing 18 as a structural support. While first centering spring 38 and second centering spring 40 are shown to have a generally serpentine internal spring configuration, or an S-shaped configuration, in FIG. 1B, other configurations are within the scope of this disclosure, such as a shape that is generally "V" shaped, "I" shaped, or another configuration. First centering spring 38 and second centering spring 40 can be machined springs, volute springs, or other types of springs or resilient members. Further, the ligaments that make up the internal spring configuration of first centering spring 38 and second centering spring 40 can be axially wider or smaller and/or tapered (i.e., thicker on a radially inner end and on a radially outer end and thinner in between) to increase flexibility and/or to have a desired stress profile, or the ligaments can have another configuration. First centering spring 38 and second centering spring 40 can be constructed from a variety of materials, including steel, titanium, another metal, a composite material, and/or other materials. However, the material used for first centering spring 38 and second centering spring 40 should be a high endurance limit material that is resilient and won't become damaged due to deflection caused by vibration and movement of shaft 12. First centering spring 38 and second centering spring 40 can be manufactured using a variety of methods, including additive manufacturing, casting, auto-coiling, or another method.

First centering spring 38 and second centering spring 40 are in contact with and held radially between outer race 26 and housing 18 so that outer race 26 of bearing 14 (and therefore shaft 12) is pushed radially inward towards the center of bearing compartment 10. First centering spring 38 and second centering spring 40 can be fastened to outer race 26 and housing 18 or held in place between outer race 26 and housing 18 by an expansive/compressive force. First centering spring 38 is held in place axially adjacent to squeeze film damper 28 by being held at a radially outer end between first retaining ring 42a and second end 32 and at a radially inner end between second retaining ring 42b and first end 30. Second centering ring 38 is held in place axially adjacent to squeeze film damper 28 by being held at a radially outer end between third retaining ring 42c and second end 32 and at a radially inner end between fourth retaining ring 42d and first end 30. Retaining rings 42a-42d are annular rings adjacent to either outer race 26 (in the case of second retaining ring 42b and fourth retaining ring 42d) or housing 18 (in the case of first retaining ring 42a and third retaining ring 42c). Retaining rings 42a-42d can be made from a variety of materials, such as metal, but should be sufficiently strong to hold first centering spring 38 and second centering spring 40 in place. Retaining rings 42a-42d can be installed by being compressed, moved into place, and allowed to expand to press against outer race 26 or housing 18 without any other type of fasteners or connectors. However, other configurations of retaining rings 42a-42d can be fastened to outer race 26 and housing 18, respectively, through a variety of other means. Also, bearing compartment 10 with centering spring and damper assembly 16 can include configurations that do not include one or all of retaining rings 42a-42d.

Housing 18 is radially outward from squeeze film damper 28, first centering spring 38, and second centering spring 40 and provides structural support. While FIGS. 1A and 1B show housing 18 as annular in shape with two approximately hemisphere cut-outs on each axial side, only a portion of housing 18 is shown, and housing 18 can have other configurations that provide additional support and allow for connection of other components to housing 18. Housing 18 includes channel 46, which extends at least partially through housing 18 to the inner surface of housing 18 to provide damping fluid to gap 44. Housing 18 can have one channel 46 or a number of channels 46 that convey damping fluid from a component, such as a damping fluid tank, to gap 44 between the inner surface of housing 18 and the squeeze film damping surface of second end 32. Housing 18 can be constructed from a variety of materials, including metal, a composite material, and/or combinations thereof. However, channel 46 and the inner surface of housing 18 should be constructed from a material or have a coating that does not chemically interact with the damping fluid to cause corrosive problems or other issues. Housing 18 can be configured to hold first centering spring 38 and second centering spring 40 in place, such as through notches or indents on an inner surface of housing 18 to accommodate the outer ends of first centering spring 38 and second centering spring 40, respectively (as shown with regards to housing 118 in FIGS. 2A and 2B). Additionally, housing 18 can be configured to incorporate a portion of first retaining ring 42a and third retaining ring 42c to hold those rings in place which, in turn, holds first centering spring 38 and second centering spring 40 in place. First centering spring 38 and second centering spring 40 can also be fastened to housing 18 through a variety of means, including an interference fit, welding, bolts, rivets, or other fasteners. Housing 18 may comprise an anti-rotation tab or another feature to prevent squeeze film damper 28, first centering spring 38, and second centering spring 40 from rotating in relation to housing 18. However, the anti-rotation feature should not prevent squeeze film damper 28, first centering spring 38, and second centering spring 40 from being radially displaced in relation to housing 18, The configuration and functionality of housing 18 is common and known to those of ordinary skill in the art.

Centering spring and damping assembly 16 with squeeze film damper 28, first centering spring 38, second centering spring 40, and surrounding components work in parallel to dampen movement of shaft 12 by damping the movement of outer race 26 while also ensuring shaft 12 remains centered by radially supporting bearing 14 (and thus shaft 12) and pushing bearing 14 inward towards the center of bearing compartment 10 when shaft 12 and bearing 14 become off centered. Squeeze film damper 28 dampens movement of shaft 12 by utilizing a damping fluid within gap 44 between second end 32 and housing 18. First centering spring 38 and second centering spring 40 center shaft 12 by expanding and compressing to handle any movement of outer race 26 caused by shaft 12, Because first centering spring 38 and second centering spring 40 are able to be contained entirely between bearing 14 and housing 18, centering spring and damping assembly 16 does not take up a large amount of axial space within gas turbine engine 10 but also effectively damping movement and centers shaft 12. While first centering spring 38 and second centering spring 40 are shown in FIGS. 1A and 1B as extending entirely in a radial direction, other configurations are possible, such as the configuration shown in FIGS. 2A and 2B.

FIG. 2A is a cross-sectional view of another embodiment of a centering spring and damper assembly, and FIG. 2B is a partial perspective cross-sectional view of the centering spring and damper assembly in FIG. 2A. FIGS. 2A and 2B show bearing compartment 110, which is similar to bearing compartment 10 of FIGS. 1A and 1B. Bearing compartment 110 includes shaft 112, bearing 114, centering spring and damper assembly 116, and housing 118. The components of bearing compartment 110 are the same as those of bearing compartment 10 in FIGS. 1A and 1B except for a few differences. First, first centering spring 138 and second centering spring 140 in FIGS. 2A and 2B have a different configuration than first centering spring 38 and second centering spring 40 in FIGS. 1A and 1B. Second, beam 134 of squeeze film damper 116 connects directly to outer race 26 of bearing 114 such that there is not a first end of squeeze film damper 116. Third, housing 118 includes notches on an inner surface that aid in holding first centering spring 138 and second centering spring 140 in place and housing 118 includes overhang 143 that keeps second centering spring 140 in place adjacent to squeeze film damper 128.

Similar to bearing compartment 10 in FIGS. 1A and 1B, bearing 114 includes inner race 120, rollers 122, separator, 124, and outer race 126. Housing 118 includes overhang 143 and channel 146. Centering spring and damper assembly 116 includes squeeze film damper 128, which has second end 132, beam 134, first sealing ring 136a, second sealing ring 136b (also known as piston rings), first retaining ring 142a, second retaining ring 142b, and fourth retaining ring 142d, with these components having the same configuration and functionality as that of FIGS. 1A and 1B.

Beam 134 of squeeze film damper 128 is attached to outer race 126 of bearing 114 so that outer race 126, second end 132, and beam 134 form an I-shaped member between rollers 122 and housing 118. Beam 134 can be connected to outer race 126 through a variety of means, including fasteners or an interference fit, or beam 34 can be one continuous and monolithic piece with outer race 126 (and second end 132). Because squeeze film damper 128 does not include a first end like squeeze film damper 28 in FIGS. 1A and 1B, outer race 126 and/or beam 134 can have an increased thickness to provide sufficient strength and transfer of loads between bearing 114 and second end 132 to allow damping within gap 144. Additionally, outer race 126 can include notches or indents to hold first centering spring 138 and second centering spring 140 in place along outer race 126 without the need for second retaining ring 142*b* and fourth retaining ring 142*d*, and/or outer race 126 can include an overhang similar to overhang 143 of housing 118.

Housing 118 in FIGS. 2A and 2B is similar to housing 18 in FIGS. 1A and 1B, except that housing 118 is configured to aid in holding first centering spring 138 and second centering spring 140 in place through notches or indents on an inner surface of housing 118 to accommodate the outer ends of first centering spring 138 and second centering spring 140, respectively. Housing 118 includes overhang 143, which is a portion of housing 118 that extends radially inward adjacent to an outer end of second centering spring 140 to hold second centering spring 140 axially to ensure second centering spring 140 remains adjacent to squeeze film damper 128. Overhang 143 can extend radially inward to be a length that sufficiently holds second centering spring 140 in place, and should be a thickness so that overhang 143 is sufficiently strong to keep second centering spring 140 in place without overhang 143 becoming damaged. Further, housing 118 can have overhang 143 directly adjacent to a notch that extends radially outward into housing 118, or housing 118 can be designed so that no notch is present. Housing 118 can include another overhang adjacent to first centering spring 138 if desired. However, housing 118 may only include one overhang to allow squeeze film damper 128 to be installed radially within housing 118 by being axially inserted from an axial side in which first centering spring 138 is located (and, thereafter, first centering spring 138 is installed). Housing 118 is configured to incorporate a portion of first retaining ring 142*a* to hold first retaining ring 142*a* in place which, in turn, holds first centering spring 138 in place. First centering spring 138 and second centering spring 140 can also be fastened to housing 118 through a variety of means, including an interference fit, welding, bolts, rivets, or other fasteners.

First centering spring 138 and second centering spring 140 have the same functionality as first centering spring 38 and second centering spring 40 of FIGS. 1A and 1B. First centering spring 138 and second centering spring 140 are radially between and in contact with outer race 26 and housing 18 and are adjacent to each axial side of squeeze film damper 28. Each of first centering spring 138 and second centering spring 140 are annular in shape and provide support to outer race 126 to keep shaft 112 centered within bearing compartment 110. As with the embodiment in FIGS. 1A and 1B, first centering spring 138 and second centering spring 140 can also be configured to extend only partially circumferentially around bearing 114 or be partially or completely offset circumferentially around bearing 114 such that first centering spring 138 is not adjacent to squeeze film damper 128 at a same axially position as second centering spring 140. Additionally, while the disclosure shows two centering springs, other embodiments can include only one centering spring on one side of squeeze film damper 128. While first centering spring 138 and second centering spring 140 are each shown to have a V-shaped cross section when viewed in a circumferential direction, other embodiment can include centering springs with a U-shaped cross section or cross sections having other shapes and configuration. First centering spring 138 and second centering spring 140 bend inward towards beam 134 of squeeze film damper 128 such that the bottom of the "V" is adjacent to, but not necessarily in contact with, beam 134. First centering spring 138 and second centering spring 140 can be in contact with beam 134 to provide support to beam 134, or space can exist between first centering spring 138 and beam 134 and second centering spring 140 and beam 134 to allow for first centering spring 138 and second centering spring 140 to move inward due to bending. While first centering spring 138 and second centering spring 140 are shown to have an internal spring configuration with multiple cutouts along an inward extending portion and a main member in a middle portion, other configurations are within the scope of this disclosure, such as a generally serpentine configuration, an S-shaped configuration, an I-shaped configuration, multiple helical springs, machined springs, volute springs, or other types of springs or resilient members. Further, the ligaments that make up the internal spring configuration of first centering spring 138 and second centering spring 140 can be tapered (i.e., thicker on a radially inner end and on a radially outer end and thinner in between) to increase flexibility and/or to have a desired stress profile, or the ligaments can have another configuration.

Centering spring and damper assembly 16/116 for use in bearing compartment 10/110 is disclosed herein that includes squeeze film damper 28/128 radially outward from bearing 14/114 between bearing 14/114 and housing 18/118, and one or both of first centering spring 38/138 and second centering spring 40/140 on each axial side of squeeze film damper 28/128. Squeeze film damper 28/128 can have first end 30 adjacent to bearing 14/114 that can form outer race 26/126 of bearing 14/114 and second end 32/132 adjacent to housing 18/118. The radially outer end of second end 32/132, which forms a squeeze film damping surface, and the inner surface of housing 18/118 form gap 44/144 therebetween to accommodate a damping fluid to dampen vibration of bearing 14/114 caused by vibration of shaft 12/112 supported by bearing 14/114. First centering spring 38/138 and second centering spring 40/140 expand and compress in the radial direction to support bearing 14/114 and center shaft 12/112. First centering spring 38/138 and second centering spring 40/140 can expand and compress entirely in the radial direction and are located entirely between bearing 14/114 and housing 18/118.

Centering spring and damper assembly 16/116 has many benefits, Centering springs 38/138 and 40/140 and squeeze film damper 28/128 work in parallel and can be contained in a relatively small area between bearing 14/114 and housing 18/118. The configuration allows for an axially compact centering spring and damper assembly 16/116 as compared to the axially long squirrel cage configuration. Because centering spring and damper assembly 16/116 is axially compact, the overall length of the engine can be shortened, resulting in reduced weight and greater performance metrics. Further, the more compact centering spring and damper assembly 16/116 can free up space for other features in the engine. While the centering springs 38/138 and 40/140 and squeeze film damper 28/128 work in parallel, they are separate components that can be removed and replaced individually if damaged. This reduces the time and cost of maintenance. Centering spring and damper assembly 16/116 may have a reduced part count as compared to the squirrel cage configurations, as the squirrel cage configurations often require bolted and/or clamped flanges. The reduction in part count can also reduce the weight of the engine as compared to the squirrel cage configurations, further increasing the efficiency of the engine. Because centering spring and damper assembly 16/116 does not require bolted and/or clamped flanges as with the squirrel cage configurations, the assembly and inspections time may be reduced. Also, the radially extending first centering spring 38/138, second centering spring 40/140, and squeeze film damper 28/128 provide a more direct load path as opposed to the squirrel cage configurations, which create large moment reactions. First centering spring 38/138 and second centering spring 40/140 can have numerous configurations that center shaft 12/112 and provide support. First centering spring 38/138 and second centering spring 40/140 can be altered depending on the adjacent bearing 14/114 and the engine in which centering spring and damper assembly 16/116 is located. First centering spring 38/138 and second centering spring 40/140 can be annular in that one or both centering springs extend circumferentially entirely around bearing 14/114, or first centering spring 38/138 and second centering spring 40/140 can extend only circumferentially partially around bearing 14/114.

Discussion of Possible Embodiments

The following are non-exclusive descriptions of possible embodiments of the present invention.

An assembly includes a bearing having an annular shape, a bearing support radially outward from the bearing, a squeeze film damper having a first end adjacent the bearing and a second end adjacent the bearing support with the second end forming a squeeze film. damping surface, and a first spring between the bearing and the bearing support with the first spring configured to resist a movement of the bearing to center a shaft radially inward from the bearing.

The assembly of the preceding paragraph can optionally include, additionally and/or alternatively, any one or more of the following features, configurations, and/or additional components:

The bearing support includes a damper fluid channel configured to provide a damping fluid to a gap between an inner surface of the bearing support and the squeeze film damping surface on the second end of the squeeze film damper.

The first spring is axially adjacent to the squeeze film damper and the assembly further includes a second spring between the bearing and bearing support and axially adjacent a side of the squeeze film damper opposite the side adjacent the first spring, the second spring configured to resist a movement of the bearing to center the shaft.

The first spring and the second spring are each configured to compress and expand entirely in a radial direction.

The first spring and the second spring are annular and extend entirely circumferentially around the bearing.

The first spring and the second spring are a series of generally "S" shaped configurations when viewed in an axial direction.

The first spring and the second spring each have a V-shaped cross section when viewed in a circumferential direction.

A first retaining ring adjacent a radially outer end of the first spring and a second retaining ring adjacent a radially inner end of the first spring.

The squeeze film damper has a beam between the first end and the second end so that the squeeze film damper has an "I" shape.

Two sealing rings between the bearing support and the second end of the squeeze film damper configured to prevent squeeze film damping fluid from flowing out of a gap between the bearing support and the second end of the squeeze film damper.

The first end of the squeeze film damper forms an outer race of the bearing.

An assembly for centering and damping a shaft includes a damper having an annular shape with a radially inner first end and a radially outer second end with the second end having a damping surface on a radially outer side, and at least one spring axially adjacent to the damper configured to resist a radial movement of the shaft.

The assembly of the preceding paragraph can optionally include, additionally and/or alternatively, any one or more of the following features, configurations, and/or additional components:

A first spring adjacent a first axial side of the damper and a second spring adjacent a second axial side of the damper.

At least one spring is configured to compress and expand entirely in a radial direction.

The at least one spring has a V-shaped cross-section when viewed in a circumferential direction.

A gas turbine engine includes a shaft, a bearing radially surrounding at least a portion of the shaft, a bearing housing radially outward from the bearing, a squeeze film damper between the bearing and the bearing housing, and a first spring adjacent the squeeze film damper between the bearing and the bearing housing configured to keep the shaft centered with respect to the bearing housing.

The gas turbine engine of the preceding paragraph can optionally include, additionally and/or alternatively, any one or more of the following features, configurations, and/or additional components:

A second spring adjacent a side of the squeeze film damper opposite the first spring, the second spring positioned between the bearing and the bearing housing and configured to keep the shaft centered with respect to the bearing housing.

The first spring and the second spring are each entirely between the bearing and the bearing housing.

A first retaining ring adjacent a radially outer end of the first spring and a second retaining ring adjacent a radially inner end of the first spring, wherein the first retaining ring and the second retaining ring are configured to prevent axial movement of the first spring.

Two sealing rings between the bearing housing and the squeeze film damper configured to prevent squeeze film damping fluid from flowing out of a gap between the bearing housing and the squeeze film damper.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. An assembly comprising:
   a bearing having an annular shape;
   a bearing support radially outward from the bearing;
   a squeeze film damper having a first end adjacent the bearing and a second end adjacent the bearing support with the second end forming a squeeze film damping surface;
   a first spring axially adjacent a first side of the squeeze film damper between the bearing and the bearing support, the first spring configured to resist a movement of the bearing to center a shaft radially inward from the bearing;
   a second spring axially adjacent a second side of the squeeze film damper opposite the first spring between the bearing and the bearing support, the second spring configured to resist a movement of the bearing to center the shaft;
   a first retaining ring adjacent a radially outer end of the first spring; and
   a second retaining ring adjacent a radially inner end of the first spring,
   wherein the first spring and the second spring each have a V-shaped cross section when viewed in a circumferential direction with a bottom of the V adjacent to the squeeze film damper.

2. The assembly of claim 1, wherein the bearing support includes a damper fluid channel configured to provide a damping fluid to a gap between an inner surface of the bearing support and the squeeze film damping surface on the second end of the squeeze film damper.

3. The assembly of claim 1, wherein the first spring and the second spring are each configured to compress and expand entirely in a radial direction.

4. The assembly of claim 1, wherein the first spring and the second spring are annular and extend entirely circumferentially around the bearing.

5. The assembly of claim 1, wherein the squeeze film damper has a beam between the first end and the second end so that the squeeze film damper has an "I" shape.

6. The assembly of claim 1, further comprising:
   two sealing rings between the bearing support and the second end of the squeeze film damper configured to prevent squeeze film damping fluid from flowing out of a gap between the bearing support and the second end of the squeeze film damper.

7. The assembly of claim 1, wherein the first end of the squeeze film damper forms an outer race of the bearing.

8. An assembly for centering and damping a shaft, the assembly comprising:
   a damper having an annular shape with a radially inner first end and a radially outer second end, the radially outer second end having a damping surface on a radially outer side;
   at least one spring axially adjacent to the damper configured to resist a radial movement of the shaft;
   a first retaining ring adjacent a radially outer end of the at least one spring; and
   a second retaining ring adjacent a radially inner end of the at least one spring,
   wherein the first retaining ring and the second retaining ring are configured to prevent axial movement of the at least one spring and the damper is entirely axially adjacent to the at least one spring.

9. The assembly of claim 8, wherein the at least one spring comprises:
   a first spring adjacent a first axial side of the damper; and
   a second spring adjacent a second axial side of the damper,
   wherein the damper is entirely axially between the first spring and the second spring.

10. The assembly of claim 8, wherein the at least one spring is configured to compress and expand entirely in a radial direction.

11. The assembly of claim 8, wherein the at least one spring has a V-shaped cross-section when viewed in a circumferential direction.

12. A gas turbine engine comprising:
    a shaft;
    a bearing radially surrounding at least a portion of the shaft;
    a bearing housing radially outward from the bearing;
    a squeeze film damper between the bearing and the bearing housing;
    two sealing rings between the bearing housing and the squeeze film damper configured to prevent squeeze film damping fluid from flowing out of a gap between the bearing housing and the squeeze film damper; and
    a first spring adjacent the squeeze film damper between the bearing and the bearing housing configured to keep the shaft centered with respect to the bearing housing, the first spring having a V-shaped cross section when viewed in a circumferential direction with a bottom of the V being adjacent to the squeeze film damper.

13. The gas turbine engine of claim 12, further comprising:
    a second spring adjacent a side of the squeeze film damper opposite the first spring, the second spring positioned between the bearing and the bearing housing and configured to keep the shaft centered with respect to the bearing housing with the second spring having a V-shaped cross section when viewed in a circumferential direction with the bottom of the V being adjacent to the squeeze film damper.

14. The gas turbine engine of claim 13, wherein the first spring and the second spring are each entirely between the bearing and the bearing housing.

15. The gas turbine engine of claim 12, further comprising:
    a first retaining ring adjacent a radially outer end of the first spring; and
    a second retaining ring adjacent a radially inner end of the first spring,
    wherein the first retaining ring and the second retaining ring are configured to prevent axial movement of the first spring.

* * * * *